(12) United States Patent
Rudolf

(10) Patent No.: US 11,077,520 B1
(45) Date of Patent: Aug. 3, 2021

(54) LASER PROCESSING HEAD AND LASER PROCESSING SYSTEM INCLUDING THE SAME

(71) Applicant: Precitec GmbH & Co. KG, Gaggenau (DE)

(72) Inventor: Andreas Rudolf, Kuppenheim (DE)

(73) Assignee: Precitec GmbH & Co. KG, Gaggenau (DE)

( * ) Notice: Subject to any disclaimer, the term of this patent is extended or adjusted under 35 U.S.C. 154(b) by 0 days.

(21) Appl. No.: 16/869,119

(22) Filed: May 7, 2020

(51) Int. Cl.
*B23K 26/064* (2014.01)
*B23K 26/12* (2014.01)
*B23K 26/70* (2014.01)

(52) U.S. Cl.
CPC .......... *B23K 26/064* (2015.10); *B23K 26/127* (2013.01); *B23K 26/702* (2015.10)

(58) Field of Classification Search
CPC .......... B23K 26/032; B23K 26/046; B23K 26/0648; B23K 26/38; B23K 26/40; B23K 2103/50; B23K 26/04; B23K 26/064; B23K 26/0665; B23K 26/0884; B23K 26/123; B23K 26/1462; B23K 26/1476; B23K 26/21; B23K 26/707; B23K 26/048; B23K 26/0643; B23K 26/082; B23K 26/14; B23K 26/702; B23K 26/703; B23K 1/0056; B23K 2103/04; B23K 26/034; B23K 26/0604; B23K 26/0608; B23K 26/0622; B23K 26/0652; B23K 26/0673; B23K 26/073; B23K 26/08; B23K 26/0853; B23K 26/12; B23K 26/1224; B23K 26/125; B23K 26/127; B23K 26/128; B23K 26/144; B23K 26/16; B23K 26/206; B23K 26/22; B23K 26/244; B23K 26/282; B23K 26/342; B23K 26/352; B23K 26/361; B23K 26/362; B23K 26/53; G02B 27/0006; G02B 6/4296; G02B 7/16; G02B 26/101; G02B 27/30; G02B 6/262; G02B 7/007; G02B 7/028; G02B 7/08; G02B 15/14; G02B 26/0816; G02B 26/105; G02B 27/09; G02B 27/0977; G02B 27/141; G02B 6/2817; G02B 6/3514; G02B 6/3604; G02B 6/3813; G02B 6/4206; G02B 6/4214; G02B 6/4215; G02B 6/4225;
(Continued)

(56) References Cited

U.S. PATENT DOCUMENTS

| | | | |
|---|---|---|---|
| 6,359,256 B1 * | 3/2002 | Biermann | .......... B23K 26/1482 |
| | | | 219/121.75 |
| 2016/0221118 A1 * | 8/2016 | Yamashita | .............. B24B 7/005 |
| 2020/0276673 A1 * | 9/2020 | Sturmer | ............... G02B 27/141 |

FOREIGN PATENT DOCUMENTS

| | | | | |
|---|---|---|---|---|
| CN | 202192375 U | * | 4/2012 | .......... B23K 26/035 |
| DE | 19655127 C2 | * | 9/2001 | ............. B23K 26/04 |
| WO | WO-2011004084 A1 | * | 1/2011 | ............. E05B 65/46 |

OTHER PUBLICATIONS

English Translation CN202192375U.*

* cited by examiner

*Primary Examiner* — Tu B Hoang
*Assistant Examiner* — Vy T Nguyen
(74) *Attorney, Agent, or Firm* — Dinsmore & Shohl LLP

(57) ABSTRACT

A laser processing head includes a housing including a mounting surface for mounting the laser processing head on a carrier; a plurality of optical components arranged within the housing; and an access opening formed in the housing for removing or inserting at least one first optical component (Continued)

among the optical components, the access opening being formed in the mounting surface.

20 Claims, 8 Drawing Sheets

(58) Field of Classification Search
CPC ...... G02B 6/4234; G02B 6/4272; G02B 7/00;
G02B 7/02; G02B 7/021; G02B 7/023;
G02B 7/025; G02B 7/04; G02B 7/09;
G02B 7/14; G02B 7/1815; B22F
2003/1056; B22F 3/1055; B33Y 30/00;
B33Y 40/00; H01S 3/06704; H01S
5/02212; H01S 5/02288; H01S 5/141;
H01S 5/4012; H01S 5/4025
USPC ............ 219/121.75, 121.84, 121.67, 121.78,
219/121.61, 121.63, 121.81, 121.83;
359/380, 385, 509, 511, 819, 368, 379,
359/381, 388, 432, 513, 641, 813, 821;
385/90
See application file for complete search history.

US 11,077,520 B1

LASER PROCESSING HEAD AND LASER PROCESSING SYSTEM INCLUDING THE SAME

FIELD OF THE INVENTION

The present disclosure relates to a laser processing head, in particular to a laser welding head or a laser cutting head, having a mounting surface for mounting the laser processing head to a carrier, and to a laser processing system including the same.

BACKGROUND OF THE INVENTION

Generally, a laser processing head for processing a workpiece using a laser beam is mounted at one surface of its housing, a so-called mounting surface, to a carrier of a laser processing system, which supports or moves the laser processing head during laser processing. Within the housing, the laser processing head includes an optical path for the laser beam in which a plurality of optical components are arranged, e.g. for focusing or collimating the laser beam. During processing of a workpiece, splashes of molten material and smoke are generated. The housing protects the optical components and other parts of the laser processing head against dirt particles, such as splashes, dust, dirt and smoke.

Should optical components get dirty, an access for servicing or changing the optical component is required. Generally, as shown in FIGS. 1 and 2, a laser processing head 1 includes a housing 10 with a plurality of horizontal modules 10a, 10b, 10c which include different optical components and are connected to each other in vertical direction. The interfaces between the modules 10a, 10b, 10c are visible and represent potential weak points of sealing. The laser processing head 1 is mounted on a carrier 30 at a mounting surface 11 of its housing 10.

In FIG. 1, horizontal access to the optical components is illustrated (removal direction indicated by the double arrows). Access openings for servicing the optical components, such as collimating or focusing optics, included in the horizontal modules 10a, 10b, 10c are provided either on a front surface, i.e. a surface opposite to the mounting surface 11, or on a lateral surface, i.e. a surface adjacent to the mounting surface 11. The access openings may be covered by corresponding access covers which are screwed to the housing. However, still a considerable amount of dirt particles can enter the housing via the access openings, causing undesired thermal effects and reducing a lifetime of optical components. Moreover, for changing the optical components, it is normally not possible to remove only the optical component, but a larger unit must be removed from the housing. In FIGS. 1 and 2, these units are indicated by dotted lines. For instance, as shown in FIG. 1, when changing the collimating optics, the collimating optics 42a must be removed together with a collimating driving unit 42b.

In FIG. 2, a vertical access to the optical components is illustrated. Here, the horizontal modules 10a, 10b, 10c, and 10d have to be disassembled in order to remove the respective optical components therefrom (removal direction indicated by the double arrows). In the configuration illustrated in FIG. 2, some of the optical components may be removed from the housing in horizontal direction, others in vertical direction after disassembling the housing into the respective modules 10a, 10b, 10c, 10d. Thus, access to the optical components inside the laser processing head is typically provided at various sides of the housing, except for the mounting surface of the housing.

However, the interfaces of the modules 10a, 10b, 10c, 10d and the access openings or access covers are heavily soiled by dust, smoke, splashes and the like. Hence, before opening the housing, the interfaces and access openings must be thoroughly cleaned. Yet, a perfect cleaning seems to be impossible. Sometimes, due to the cleaning process, dirt particles are additionally introduced into the housing, e.g. when compressed air is directed to sealings of the interfaces or access openings. Thus, even when access covers or sealings are provided at the interfaces or access openings, the housing is not fully protected from introduction of dirt particles.

Moreover, since the access to the optical components is typically provided on exposed surfaces of the housing, the user often feels invited to directly open the housing in the dirty environment of the laser processing system. Also, it is not intuitive which optical components should be accessed by the user, and which optical components should only be accessed by an experienced service engineer. This may lead to unintentional opening of the laser processing head, with drastic consequences.

Further, due to the many interfaces between the modules and access openings or covers which are visible in the mounted state of the laser processing head, only few areas are available for customized design.

The concept of current laser processing heads is still based on the design of CO2 laser processing heads, where simple, front-side or lateral-side access to the optical components was uncritical and practical. However, laser processing heads using lasers with a wavelength in the range of 400 to 2000 nm are very sensitive for soiled optical components, since this laser wavelength range corresponds to the range of sizes of typical dirt particles. Thus, due to this relation, the dirt particles absorb more laser power than in laser processing heads using CO2 laser having a wavelength of about 10 μm. Thus, in times of high-performance fiber lasers, this design of front/lateral-side access is no longer up to date.

SUMMARY OF THE INVENTION

It is an object of the present disclosure to provide a laser processing head with improved sealing against dirt particles to make sure that optical components remain clean and operational for as long as possible, while still allowing access to the optical components of the laser processing head.

It is another object of the present disclosure to provide a laser processing head with easy and safe access to the optical components for service and replacement.

It is still another object of the present disclosure to provide a laser processing head ensuring that access to at least some of the optical components is performed by experienced staff.

It is still another object of the present disclosure to provide a laser processing head with improved outer appearance.

One or more of these objects are solved by the features disclosed herein. Features of preferred embodiments are disclosed.

According to one aspect of the present disclosure, a laser processing head for processing a workpiece using a laser beam includes a housing including a mounting surface for mounting the laser processing head on a carrier; a plurality of optical components arranged within the housing; and an access opening formed in the housing for removing or inserting at least one first optical component among the optical components, the access opening being formed in the mounting surface. The laser processing head may be a laser cutting head and/or a laser welding head.

The invention is based on the idea that among the surfaces of the housing of the laser processing head, the mounting surface is least exposed to dirt particles, such as molten material, dust, dirt and smoke. Therefore, by providing the access opening on the mounting surface, an amount of dirt particles entering the housing via the access opening can be reduced. Thus, a sealed state of the housing can be improved, thereby extending a period of use of optical components included in the laser processing head.

The housing may form an exterior of the laser processing head. The housing may include several parts or modules which together form the exterior of the laser processing head. The housing may include an optical path for the laser beam, the plurality of optical components being arranged in the optical path. In one example, the optical path of the laser processing head may be linear. The mounting surface of the housing may extend in a plane parallel to the optical axis of the first optical component and/or to the optical path of the laser processing head. The access cover may be removably mounted to the housing or to the mounting surface, e.g. by means of screws. The carrier may be a carrier for holding or positioning the laser processing head during laser processing, e.g. a carrier of a laser processing system. That is, e.g. for laser processing, the laser processing head may be mounted on the carrier in a processing position in which the mounting surface is at least partially covered by the carrier.

Further, an access cover may be provided for opening or closing the access opening. The access cover may be mountable to the housing by means of screws or the like. The access cover may be part of an optical frame or of a cartridge comprising the first optical component accessible via the respective access opening. Also, in some embodiments, the carrier may be configured to cover the access opening.

The first optical component may include at least one of: a focusing optics, a focusing lens, a collimating optics, a collimating lens, a protective window, a mirror and a beam shaping optics. The first optical component may be mounted on an optical frame or in a cartridge. The cartridge may be a sealed unit including two protective windows with the first optical component inserted therebetween. Thus, the optical frame or cartridge with the first optical component mounted therein may be removable through the access opening. That is, the first optical component may be removed while remaining mounted on the optical frame or cartridge. The access cover may be connected to the first optical component, in particular to the optical frame or cartridge. By these means, the first optical component, or the optical frame or cartridge with the first optical component, can be removed from the laser processing head together with the access cover, thus simplifying the exchange of optical components.

The laser processing head may further include a driving unit installed in the housing for moving the first optical component parallel and/or perpendicular to the optical axis of said first optical component. For instance, the first optical component may be a focusing or collimating optics connected to a driving unit for adjusting a position thereof within the housing. The driving unit may include a motor. The driving unit may be a manual driving unit or an automatically or remotely controllable driving unit. In one embodiment, when removing the first optical component through the access opening, the driving unit for moving said first optical component may remain installed in the housing. For instance, the driving unit for moving said first optical component may be fixedly installed in the housing.

The plurality of optical components may include a second optical component, e.g. a protective window. The housing may include a further opening formed in a housing surface other than the mounting surface for removing or inserting the second optical component. Said housing surface may be opposite to the mounting surface and/or adjacent to the mounting surface. The housing surface may extend parallel to the mounting surface and/or to the optical path of the laser processing head and/or to the optical axis of the first and/or second optical component. For instance, the second optical component may be the last optical component of the laser processing head in propagation direction of the laser beam. In other words, the second optical component may be an optical component, such as a protective window, that is closest to a processing side of the processing head and/or to a point where the laser exits the laser processing head. The laser processing head may further include a nozzle, and the second optical component may be an optical component, such as a protective window, adjacent or closest to the nozzle.

The mounting surface may include a grounding area for electrical grounding of the laser processing head. The mounting surface may include alignment means, such as alignment pins or holes, for aligning the laser processing head with respect to the carrier. The mounting surface may include fixing means, such as screws, screw holes or bolts, for fixing the laser processing head to the carrier. The mounting surface may include excavated material or an excavation for weight reduction.

The laser processing head may include a mounting cover for covering the mounting surface. The mounting cover may be hingedly coupled to the mounting surface and may be configured to be mounted on the carrier. That is, the mounting cover may be rotatably or pivotably coupled to the mounting surface, e.g. by at least one hinge unit. A hinge axis or rotation axis thereof may be parallel to the mounting surface and/or to the optical path of the laser processing head and/or to the optical axis of the first optical component. By this hinged arrangement, the laser processing head can be rotated with respect to the carrier to expose the mounting surface and the access opening formed therein. Thus, an exchange of the first optical component can be performed without removal of the laser processing head from the carrier. Optical fibers, electrical connections and the like do not have to be disassembled but may remain connected to the laser processing head. Further, this hinged arrangement can be used with a conventional carrier of a laser processing system, since the mounting cover may provide mounting means for mounting the laser processing head to the carrier, in addition to the at least one hinge unit rotatably coupling the mounting cover to the mounting surface.

The mounting cover may have an arbitrary shape. Preferably, however, the mounting cover may have a frame shape for reducing weight. The mounting cover may include fixing means, such as screws, screw holes or bolts, to mount the laser processing head on the carrier.

Optionally, the laser processing head, in particular the mounting surface and/or the mounting cover, may include locking means for locking the laser processing head on the carrier in a processing position in which the mounting surface is at least partially covered by the carrier. The locking means may include a screw, bolt, clamp or latch or the like.

The housing may include at least one housing surface opposite to the mounting surface and/or at least one housing surface adjacent to the mounting surface which is a continuous or integral surface. Here, a continuous surface may mean a surface without openings or interfaces. The housing surface may extend parallel to the mounting surface. Thus, sealing of the housing and its components can be improved. Further, a large area can be provided for other functions, such as for customizing an exterior of the laser processing head, e.g. using decorative adhesive foils, or mounting cables or external devices. Thus, the housing surface may include means for cable guiding and/or mounting means for mounting external devices, such as cameras for process monitoring or displays.

The laser processing head, in particular its optical components, may be configured for use with a fiber laser and/or for use with a laser beam having a wavelength in the wavelength range of 400 nm to 2000 nm or for use with a laser beam having a wavelength of 970 nm or 1030 nm or 1070 nm, and/or for use with a laser power of at least 2 kW, at least 6 kW, at least 12 kW, at least 20 kW, at least 30 kW, at least 50 kW or at least 70 kW, or with a laser power up to 100 kW.

According to a further aspect, a laser processing system is provided, including a carrier and a laser processing head according to any one of the herein described embodiments, the laser processing head being mounted on the carrier. That is, the mounting surface of the laser processing head is mounted to the carrier. For or during laser processing, the laser processing head may be mounted on the carrier in a processing position in which the mounting surface is at least partially covered by the carrier.

The carrier may be configured to shield the access cover when the laser processing head is mounted on the carrier and/or in the processing position of the laser processing head. The carrier may block or cover the access cover at least partially. Alternatively, the carrier may surround the access cover at least partially. The carrier may be configured to hold or position the laser processing head during laser processing, e.g. with respect to a work piece. The carrier may be mounted on a rail system to move the laser processing head in one direction or in two or three orthogonal directions. In one example, the carrier may include or be a part of a manipulator for moving the laser processing head, such as a robot arm having 2 or more axis, e.g. 6 axes.

The laser processing system may include a laser source for generating a laser power of at least 50 kW or at least 70 kW and/or for generating a laser beam having a wavelength in the range of 400 nm to 2000 nm or having a wavelength of 970 nm or 1030 nm or 1070 nm.

A sealing may be provided between the mounting surface and the carrier. The sealing may be arranged along a circumference or outer edge of the mounting surface. The sealing may surround at least the access opening for sealing the same, in particular in the processing position of the laser processing head.

The mounting surface of the laser processing head may be hingedly coupled to the carrier, e.g. by means of at least one hinge unit. Thus, the laser processing head may be rotatably coupled to the carrier. By these means, the mounting surface and the access opening formed therein which is normally covered or blocked by the carrier can be easily exposed. Optionally, the carrier and/or the laser processing head may include locking means for locking the laser processing head on the carrier in a processing position in which the mounting surface is at least partially covered by the carrier. The locking means may include a screw, bolt, clamp or latch or the like.

The carrier may include a carrier frame mounted to the mounting surface of the laser processing head, the carrier frame exposing the access opening. Hence, the access opening may be directly accessible through the carrier frame.

The carrier may include a fully automated changing device for automatically changing the at least one first optical component.

DETAILED DESCRIPTION

Throughout this disclosure, same elements are denoted with the same reference signs.

Generally, a laser processing head 1 is mounted to a carrier 30 of a laser processing system at a mounting surface 11 of a housing 10 of the laser processing head 1. In the related art, the mounting surface 11 has almost no other functions besides this mounting function.

According to the present disclosure, the inventors have noted that the mounting surface 11 is the surface of the housing 10 that is best protected against dirt. Thus, the mounting surface 11 is selected for providing access openings to the optical components of the laser processing head. By moving the access openings from other surfaces of the housing to the mounting surface 11, the tightness of the housing 10 against dirt particles can be improved. Moreover, the other surfaces of the housing 10 besides the mounting surface 11 can be designed as integral surfaces, i.e. without gaps, interfaces or openings, thereby improving an outer appearance. In addition, this increases the confidence of a user in the tightness of the laser processing head against dirt particles. The other surfaces may also be used for other functions. For instance, means for cable routing, a camera for monitoring the laser processing or a display may be mounted at one or more of these other surfaces.

Figure 1:
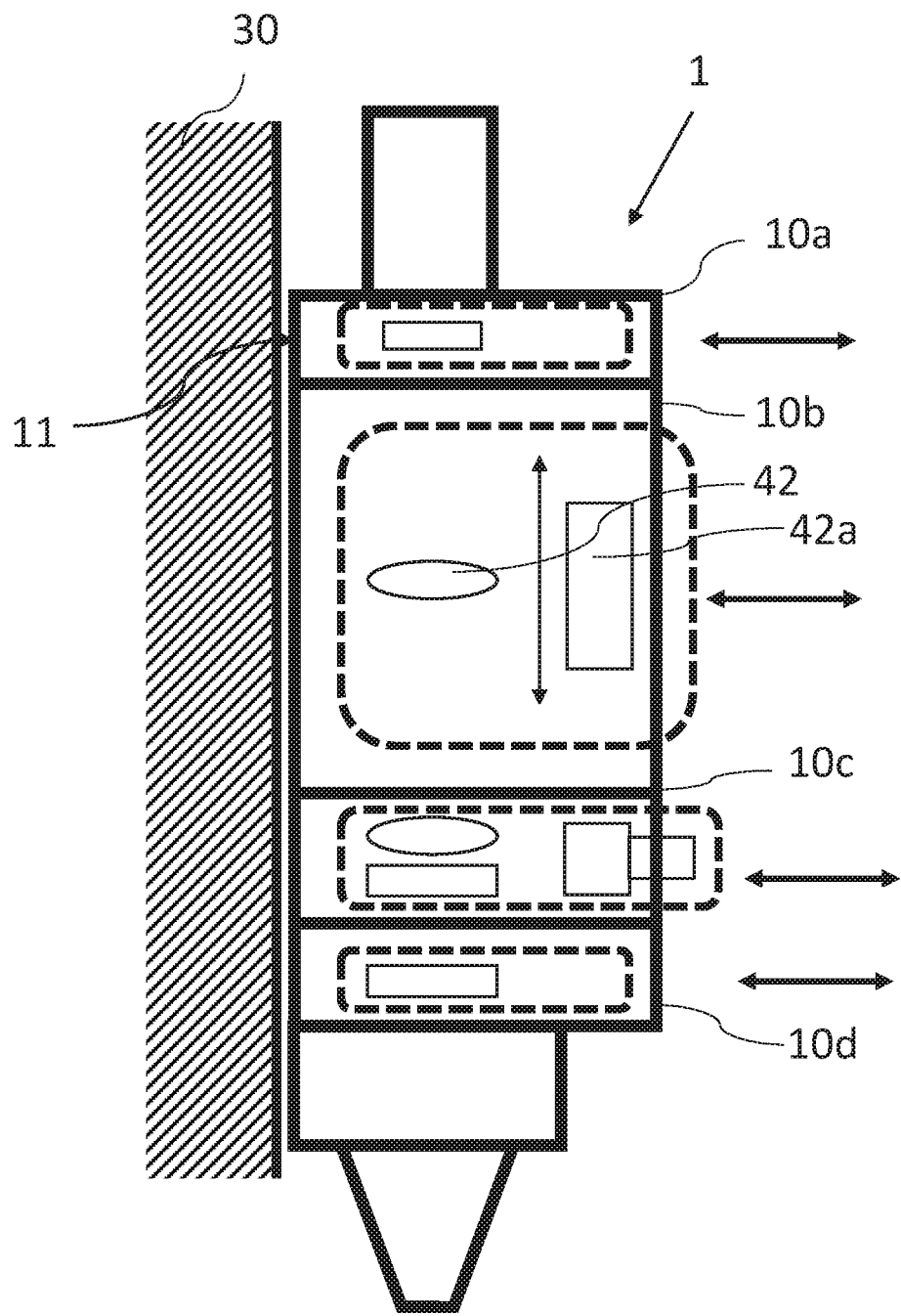
FIG. 1 is a schematic view of a laser processing head of the related art with horizontal access to optical components.
Figure 2:
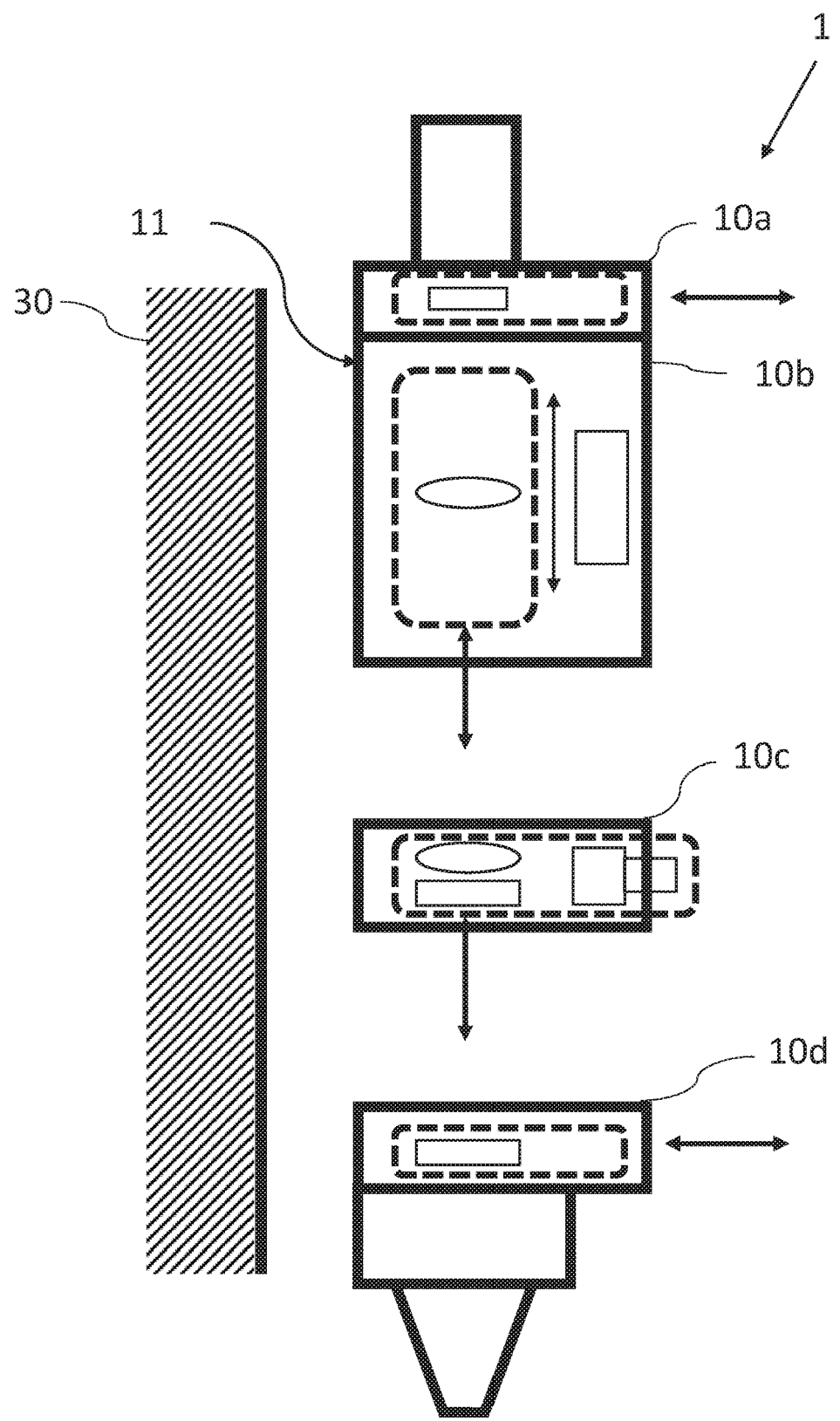
FIG. 2 is a schematic view of another laser processing head of the related art with horizontal and vertical access to optical components.
Figure 3:
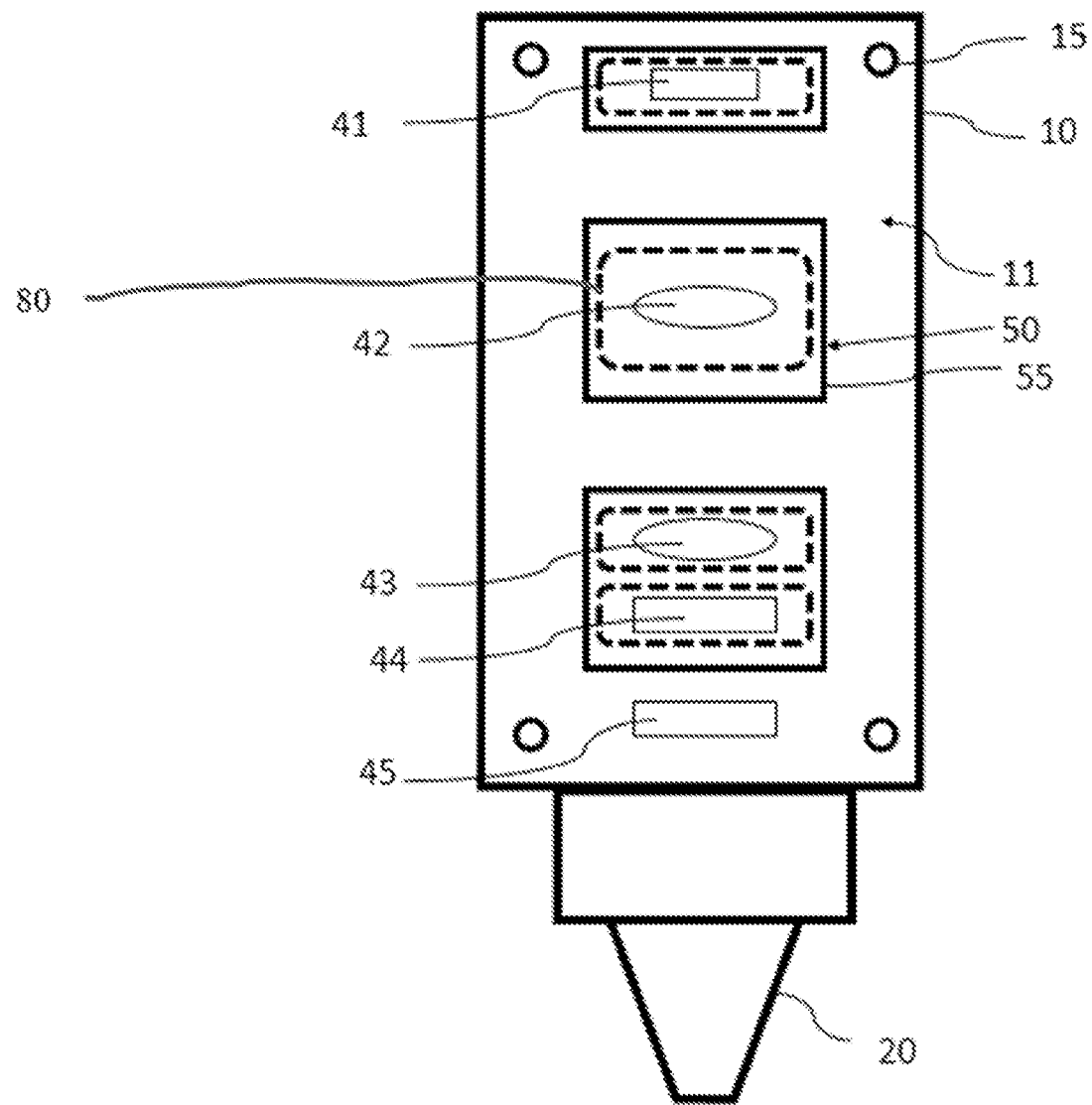
FIG. 3 shows a rear view of a laser processing head according to an embodiment of the present disclosure.

In FIG. 3, a rear view of a laser processing head 1 according to the present disclosure is shown. That is, the mounting surface 11, which may also be referred to as a rear surface of the housing 10, is shown. The laser processing head 1 includes several optical components arranged in an optical path within the housing 10. For instance, the optical components may include a first protective window 41, a collimating optics 42, a focusing optics 43, and a second protective window 45. The first protective window 41 may be the first optical element in the optical path of the laser processing head, i.e. along the laser beam propagation direction. Similarly, the second protective window 45 may be the last optical element in the optical path of the laser processing head, i.e. along the laser beam propagation direction. That is, the second protective window 45 may be the optical component of the laser processing head that is closest to a nozzle 20 of the laser processing head. Of course, the laser processing head 1 may include additional protective windows, which may be arranged between the first protective window 41 and the second protective window 45. Also, the laser processing head 1 may include only one protective window, i.e. either window 41 or window 45. Although the focusing optics 42 and the collimating optics 43 are respectively illustrated as a lens, the focusing optics 42 and the collimating optics 43 may respectively include a lens, a group of lenses, a lens module and the like. Optionally, a further optical element 44 may be provided which can be another protective window or a beam splitter or the like. One or more of the optical components may be mounted on an optical frame and/or in a cartridge 80. Here, the cartridge 80 may include at least two protective windows, in addition to the respective optical component, such as the collimating optics 42 or the focusing optics 43.

For at least some of these optical components of the laser processing head, an access opening 50 for servicing or replacing the respective optical component is provided on the mounting surface 11. The access opening is covered by an access cover 55. When removing the access cover 55 from the mounting surface 11, the access opening 50 is exposed and the respective at least one optical component can be serviced or replaced. In the example illustrated in FIG. 3, the collimating optics 43 and the optical element 44 can be accessed via the same access opening 50. However, an access opening 50 may be provided for each of the optical components separately.

As shown in FIG. 3, fixing means 15, such as screw holes, screws or bolts, may be provided additionally on the mounting surface 11 in order to mount the laser processing head 1 to the carrier 30. Also, alignment means (not shown), such as pin holes and/or pins, may be provided on the mounting surface 11 for accurately and reproducibly aligning the laser processing head 1 with respect to the carrier 30. Further, the mounting surface 11 may include a grounding area for electrical grounding of the laser processing head 1. In order to reduce weight, the mounting surface 11 may be excavated.

Figure 4:
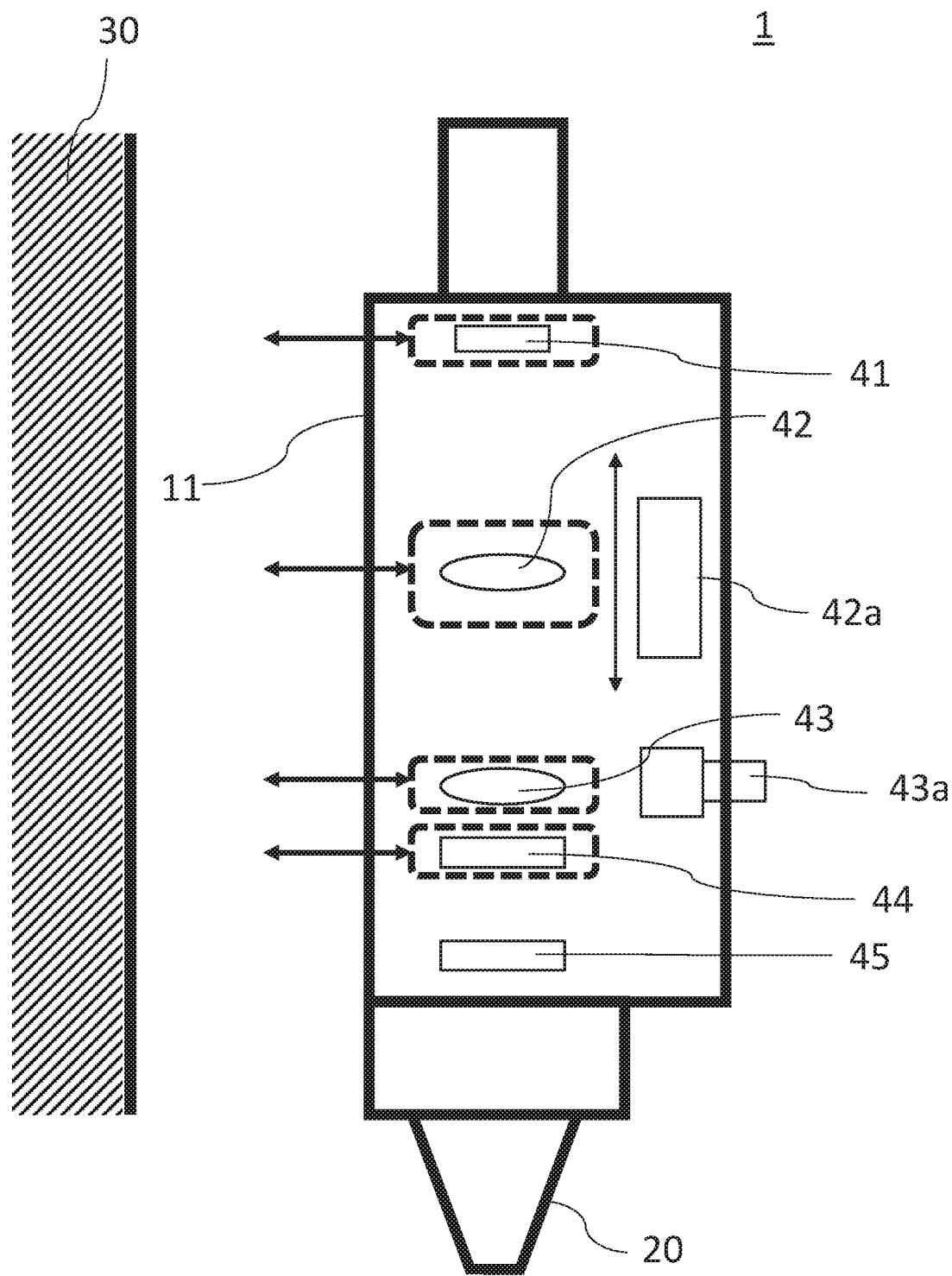
FIG. 4 shows a lateral view of the laser processing head of FIG. 3.

In FIG. 4, a lateral view of the laser processing head 1 of FIG. 3 is shown. The laser processing head 1 is dismounted from the carrier 30. The double-arrows indicate the direction along which replacement of the optical components may be performed. As one can see, the replacement is performed in horizontal direction via the access openings 50 on the mounting surface 11, i.e. in a direction perpendicular to the optical axis of the optical components or perpendicular to the mounting surface 11. The dotted lines indicate the units 80 which are removed from the housing 10. In particular, the collimating optics 42 may be removed from the housing, while a driving unit 42a for moving the collimating optics 42 along its optical axis (arrow) and/or perpendicular thereto (not shown) may stay in place. Likewise, the focusing optics 43 may be removed without removing a driving unit 43a for moving the focusing optics 43 along its optical axis and/or perpendicular thereto (not shown).

Most of the optical components do not need to be accessed during normal operation. By providing the access openings 50 for these optical components at the mounting surface 11 on the rear side of the laser processing head 1, the access openings 50 and the optical components can be protected against dirt and allow clean servicing thereof. Here, clean access is more important than servicing time. In order to improve the tightness against dirt, a sealing 33 may be provided between the mounting surface 11 and the carrier 30. Preferably, the sealing 33 surrounds all access openings 50 or access covers 55. Alternatively, a plurality of sealings 33 may be provided respectively surrounding one of the access openings 50 on the mounting surface 11. By providing the access openings 50 for the optical components on the mounting surface 11, the access openings 50 are not visible during normal operation. Moreover, the access openings 50 are protected against unauthorized access by a normal user.

Figure 5:
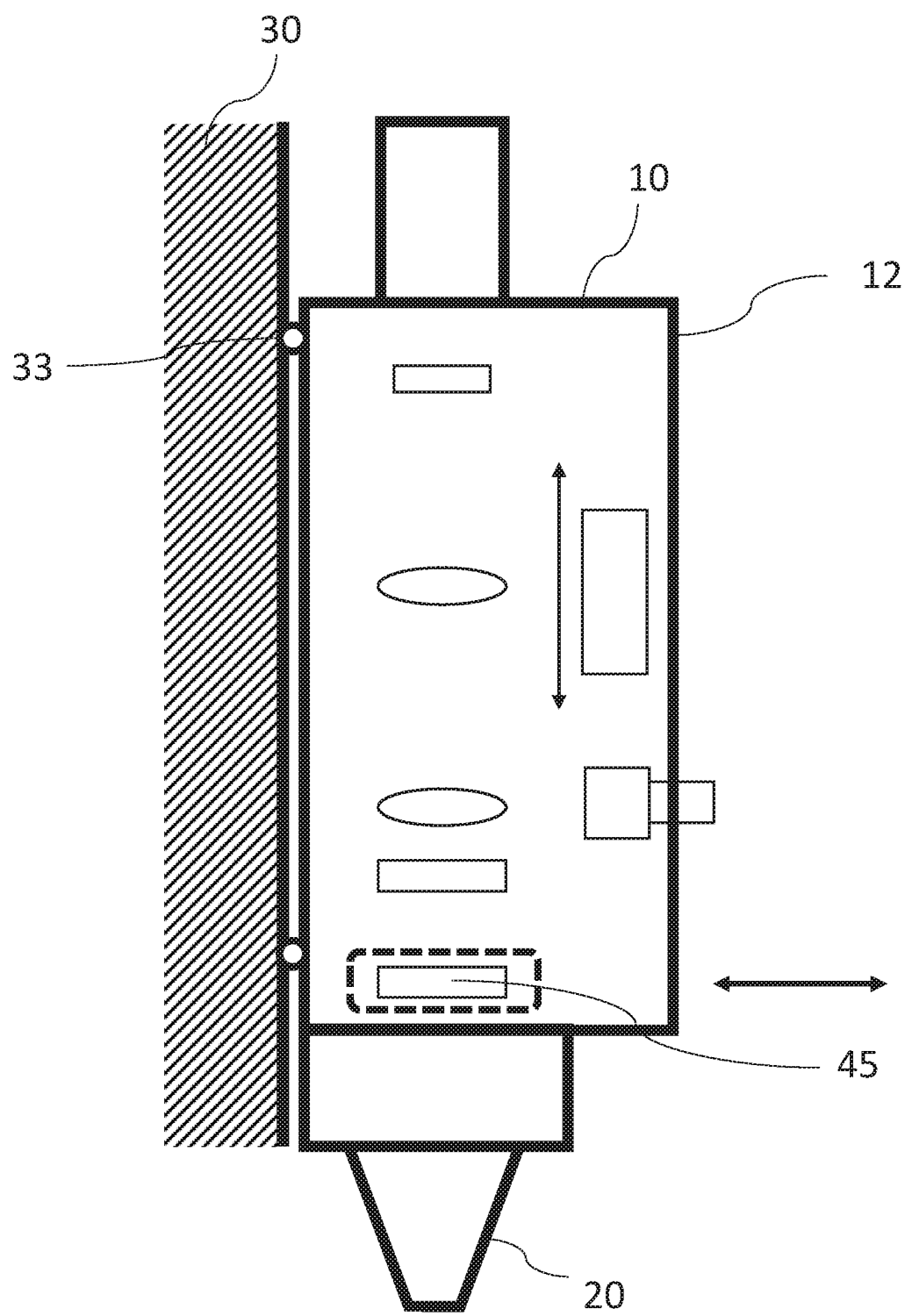
FIG. 5 shows a view of the laser processing head of FIG. 3 mounted to a carrier of a laser processing system.

The second protective window 45, however, may not be accessible via the mounting surface 11. The second protective window 45 is a wear part and has to be checked and replaced regularly during normal operation. Therefore, as shown in FIG. 5, the second protective window 45 may be accessible via a housing surface 12 opposite to the mounting surface 11, i.e. via a front surface of the housing 10. By these means, the access can be easily performed by a user. Yet, the present invention is not limited to this, but the second protective window 45 may also be accessible via the mounting surface 11.

According to further embodiments of the present disclosure, the accessibility of the mounting surface 11 is improved for experienced staff by rotatably connecting the laser processing head 1 with the carrier 30 using one or more hinge units. Preferably, the laser processing head 1 may be rotatable about at least 90° with respect to the carrier 30. The rotation axis may be vertical. In other words, the rotation axis may extend parallel to the optical path of the laser processing head, i.e. parallel to the mounting surface 11. The laser processing head 1 may further include locking means for locking the laser processing head 1 in a processing position, i.e. for blocking any rotating movement about the hinge units. The blocking means may be a latch mechanism or the like.

Figure 6:
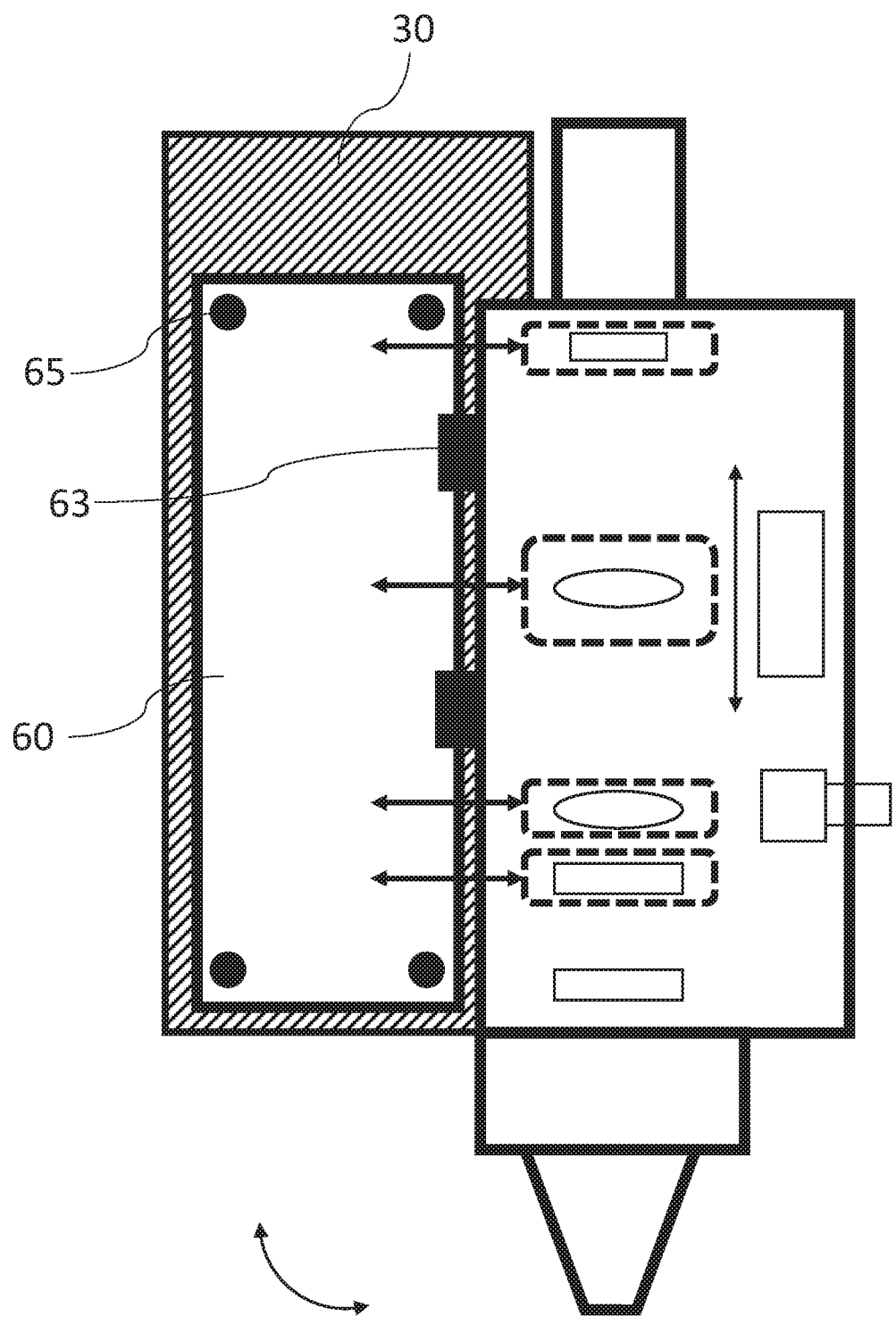
FIG. 6 shows a view of a laser processing head having a mounting cover hingedly mounted to a carrier of a laser processing system according to another embodiment of the present disclosure.

In one embodiment, shown in FIG. 6, the laser processing head 1 is provided with a mounting cover 60 that is hinged to the mounting surface 11 of the housing 10 by at least one hinge unit 63. The hinge unit 63 may allow a rotation of at least 90°. The mounting cover 60 is mountable to a carrier 30 of a laser processing system by fixing means 65, such as screws or bolts. Thus, the laser processing head 1 is rotatable with respect to the mounting cover 60, or with respect to the carrier 30, about a rotation axis of the hinge unit 63.

Figure 7:
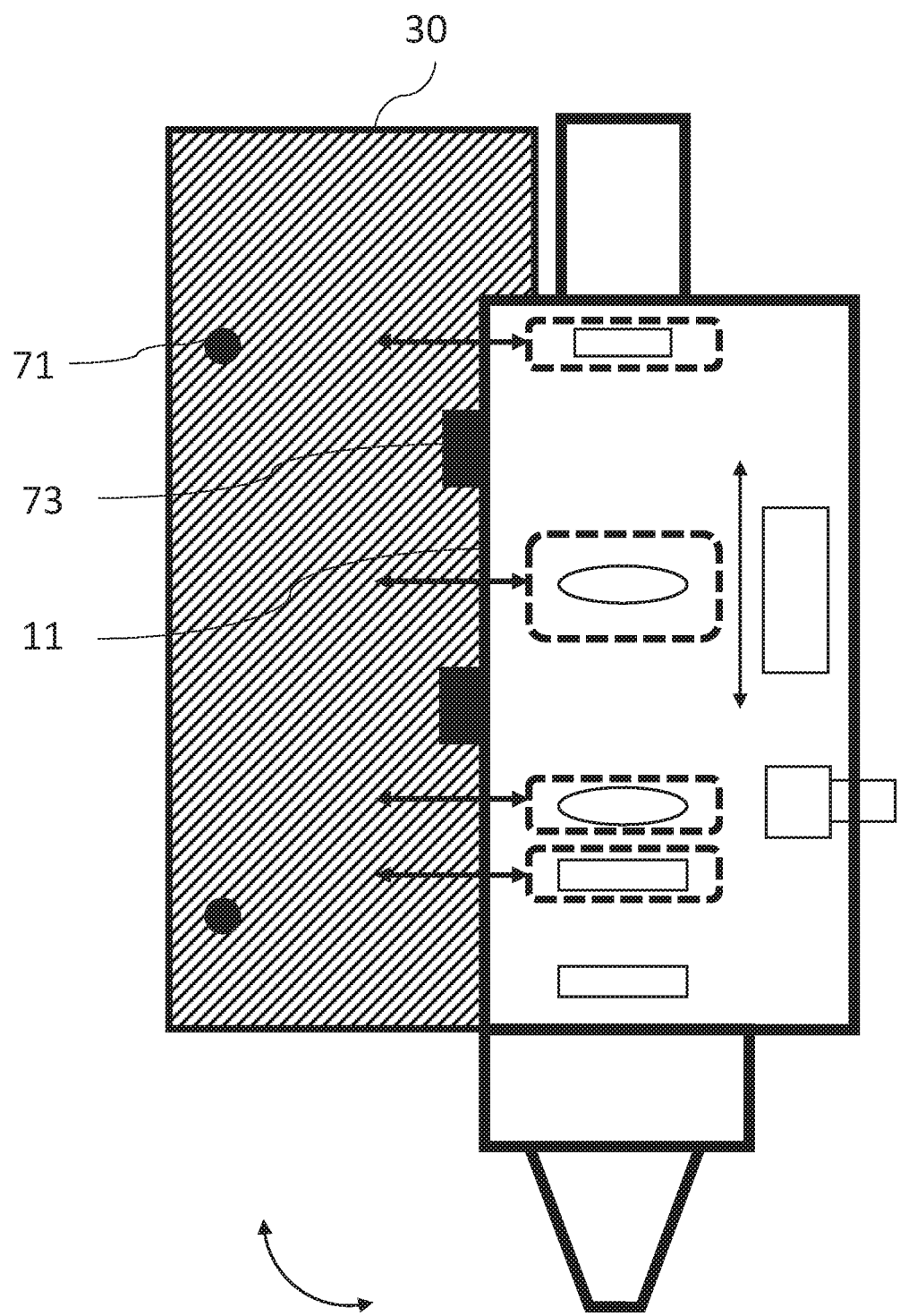
FIG. 7 shows a view of a laser processing head hingedly mounted to a carrier of a laser processing system according to another embodiment of the present disclosure.

In another embodiment, shown in FIG. 7, at least one hinge unit 73 is provided on the mounting surface 11 to be hinged to the carrier 30. Thus, the laser processing head 1 can be rotatably coupled to the carrier 30 directly at its mounting surface 11. For fixing the laser processing head 1 in the processing position at the carrier 30, locking means, such as screws and screw holes, a latch assembly, a snapping mechanism or the like, may be provided at the carrier 30 and/or at the laser processing head 1. In FIG. 7, screw holes 71 are exemplarily shown at the carrier 30 for fixing the laser processing head in the processing position at the carrier 30 by screws. The corresponding screw holes in the processing head 1 are not shown.

Figure 8:
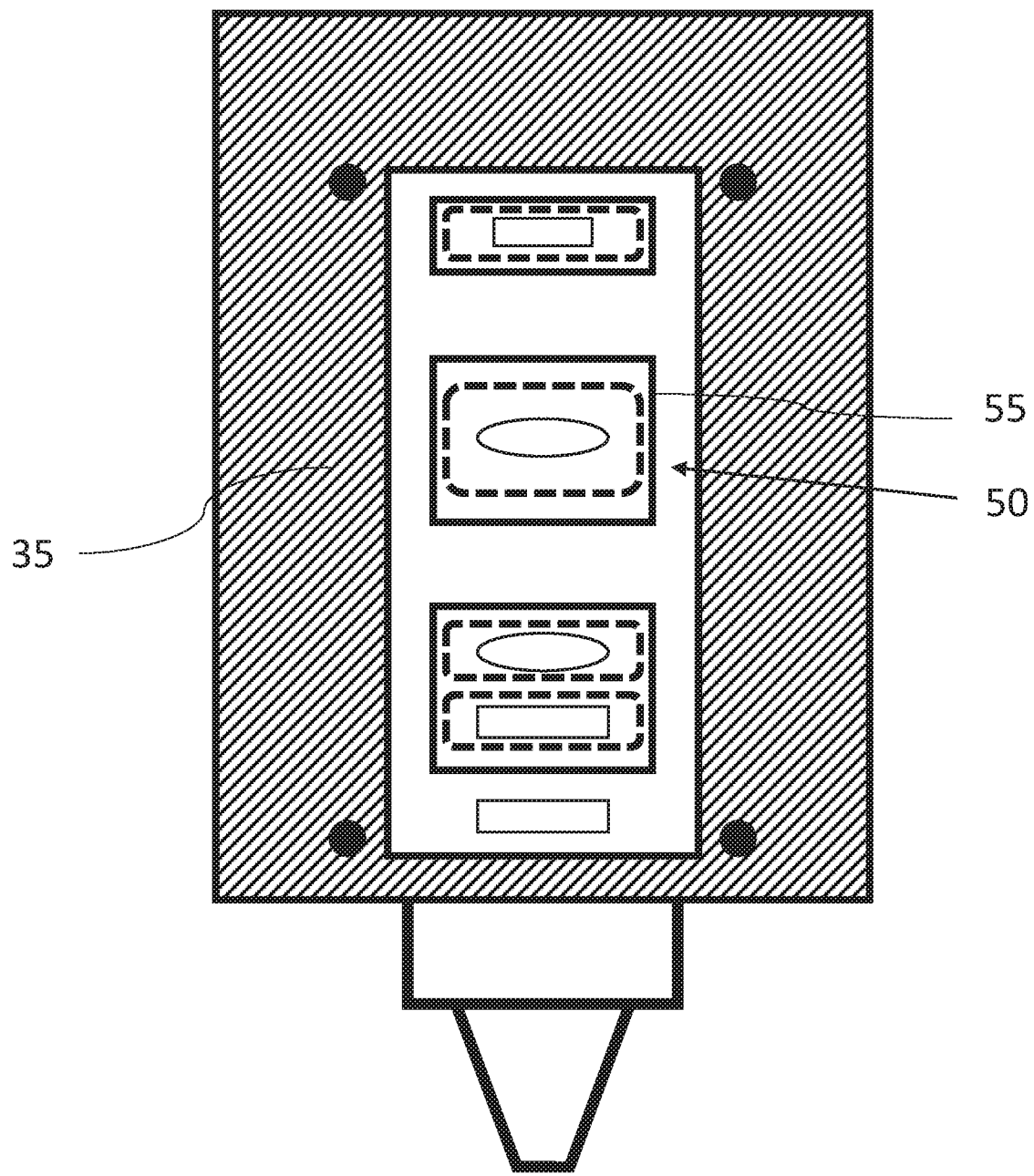
FIG. 8 shows a view of a laser processing system having a carrier frame and a laser processing head mounted thereto according to another embodiment of the present disclosure.

According to further embodiments of the present disclosure, the accessibility of the mounting surface 11 is improved by the carrier 30 including a carrier frame 35. As shown in FIG. 8, the carrier frame 33 has a frame shape with an opening in the center. The mounting surface 11 of the laser processing head 1 is mounted to the carrier frame 33 such that the access covers 55 are exposed through the carrier fame 35. Preferably, the carrier frame 35 surrounds all access covers 55 on the mounting surface 11 of the laser processing head. A sealing 33 may be provided between the carrier frame 35 and the mounting surface 11, as mentioned earlier. By these means, the access openings 50 can be used for service of the optical components, without dismounting the laser processing head 1 from the carrier 30 or rotating the laser processing head 1 with respect to the carrier 30. This improves both easy access and mounting stability of the laser processing head on the carrier.

The carrier 30 or the carrier frame 33 may include an assistance device which is configured to assist in releasing or guiding removal of the optical components. Alternatively, the carrier 30 or the carrier frame 33 may include an automated changing device for changing the optical components. The changing device may include a driving unit or motor as well as replacement components for each optical component. This allows a remotely controlled and fully automated change of the optical components.

According to the present disclosure, access openings are moved to a rear surface or mounting surface 11 of the laser processing head 1. Thus, the access openings disappear from view of a user. On the one hand, this improves the tightness of the laser processing head against dirt particles, on the other hand, this improves the outer appearance and allows for customized design, e.g. using large 3D adhesive films covering several surfaces of the housing.

The invention claimed is:

1. A laser processing head used in combination with a laser source producing a laser beam, the laser processing head comprising:
   a housing including a mounting surface for mounting the laser processing head on a carrier;
   a plurality of optical components arranged within the housing, the plurality of optical components configured to be optically coupled to the laser source such that the laser beam travels through the plurality of optical components along an optical path, the plurality of optical components including at least one first optical component;
   the mounting surface of the housing extending in a plane parallel to the optical path through the at least one first optical component; and
   at least one access opening with a cover, the at least one access opening formed in the mounting surface of the housing for removing or inserting the at least one first optical component in a direction perpendicular to the mounting surface and perpendicular to the optical path;
   whereby as the laser processing head is mounted on the carrier, the mounting surface with the at least one access opening and the cover is at least partially covered by the carrier.

2. The laser processing head of claim 1, wherein the at least one first optical component includes at least one of: a focusing optics, a focusing lens, a collimating optics, a collimating lens, a protective window and a beam shaping optics.

3. The laser processing head according to claim 1, wherein the at least one first optical component is mounted on an optical frame or in a cartridge.

4. The laser processing head according to claim 1, further including a driving unit comprises a motor installed in the housing for moving the at least one first optical component parallel or perpendicular to the optical path through the at least one first optical component.

5. The laser processing head according to claim 4, wherein when removing the at least one first optical component through the at least one access opening, the driving unit remains installed in the housing.

6. The laser processing head claim 1, wherein:
   the housing has a plurality of housing surfaces;
   the plurality of optical components further includes a second optical component;
   one of the plurality of housing surfaces of the housing other than the mounting surface is either perpendicular to the mounting surface or opposite to the mounting surface and extends parallel to an optical path through the second optical component; and
   a further opening being formed in the one of the plurality of housing surfaces of the housing other than the mounting surface, the further opening being for removing or inserting the second optical component.

7. The laser processing head of claim 6, further including a nozzle, the second optical component being a protective window adjacent to the nozzle or an optical component closest to the nozzle.

8. The laser processing head of claim 6, wherein the second optical component is an optical component closest to a point where the laser beam exits the laser processing head.

9. The laser processing head claim 1, wherein the mounting surface includes a grounding area for electrical grounding of the laser processing head or alignment means for aligning the laser processing head with respect to the carrier or fixing means for fixing the laser processing head to the carrier.

10. The laser processing head according to claim 1, further including a mounting cover hingedly coupled to the mounting surface and including fixing means for fixing the last processing head to the carrier.

11. The laser processing head according to claim 1, wherein at least one housing surface of the housing opposite to the mounting surface or at least one housing surface of the housing adjacent to the mounting surface is a continuous surface.

12. The laser processing head according to claim 1, wherein the laser processing head is for use with the laser beam having a wavelength in the wavelength range of 400 nm to 2000 nm or with the laser beam having a wavelength of 970 nm or 1030 nm or 1070 nm.

13. The laser processing head according to claim 1, wherein the cover for the at least one access opening is mountable to the housing.

14. The laser processing head according to claim 13, wherein the cover is part of an optical frame or of a cartridge comprising the at least one first optical component accessible via the at least one access opening.

15. A laser processing system, comprising:
   a carrier;
   a laser processing head for use with a laser source producing a laser beam, the laser processing head comprising:
      a housing including a mounting surface for mounting the laser processing head on the carrier;
      a plurality of optical components arranged within the housing, the plurality of optical components configured to be optically coupled to the laser source such that the laser beam travels through the plurality of optical components along an optical path, the plurality of optical components including at least one first optical component;

the mounting surface of the housing extending in a plane parallel to the optical path through the at least one first optical component; and at least one access opening with a cover, the at least one access opening formed in the mounting surface of the housing for removing or inserting the at least one first optical component in a direction perpendicular to the mounting surface and perpendicular to the optical path;

the laser processing head being mounted on the carrier such that the mounting surface with the at least one access opening and the cover is at least partially covered by the carrier.

16. The laser processing system of claim 15, further including a sealing between the mounting surface and the carrier.

17. The laser processing system of claim 15, wherein the mounting surface of the laser processing head is hingedly coupled to the carrier.

18. The laser processing system of claim 15, wherein the carrier includes a carrier frame mounted to the mounting surface of the laser processing head, the carrier frame exposing the at least one access opening.

19. The laser processing head according to claim 1, wherein the plurality of optical components further comprises a mirror.

20. The laser processing system according to claim 15, wherein the plurality of optical components further comprises a mirror.

* * * * *